(12) United States Patent
Pialot et al.

(10) Patent No.: US 10,864,692 B2
(45) Date of Patent: Dec. 15, 2020

(54) CURING MEMBRANE FOR A TIRE

(71) Applicant: Compagnie Generale Des Etablissements Michelin, Clermont-Ferrand (FR)

(72) Inventors: Frédéric Pialot, Clermont-Ferrand (FR); Gérard Bor, Clermont-Ferrand (FR); Alain Faugeras, Clermont-Ferrand (FR); Frédéric Ramz, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/487,640

(22) PCT Filed: Mar. 29, 2018

(86) PCT No.: PCT/FR2018/050786
§ 371 (c)(1),
(2) Date: Aug. 21, 2019

(87) PCT Pub. No.: WO2018/178587
PCT Pub. Date: Oct. 4, 2018

(65) Prior Publication Data
US 2020/0016856 A1 Jan. 16, 2020

(30) Foreign Application Priority Data
Mar. 30, 2017 (FR) ...................... 17 52723

(51) Int. Cl.
*B29D 30/06* (2006.01)
*B05D 1/02* (2006.01)
(Continued)

(52) U.S. Cl.
CPC .......... *B29D 30/0654* (2013.01); *B29C 33/62* (2013.01); *B29C 43/3642* (2013.01);
(Continued)

(58) Field of Classification Search
CPC ........ B29D 30/0654; B29D 2030/0655; B29C 33/58; B29C 33/62; B05D 1/002; B05D 1/02; B05D 5/08; B05D 5/083
See application file for complete search history.

(56) References Cited

U.S. PATENT DOCUMENTS 4,853,069 A * 8/1989 Williams ................. C08K 3/04
156/401
5,658,512 A * 8/1997 Nobata ................... B29C 33/68
264/130

(Continued)

FOREIGN PATENT DOCUMENTS

EP 0385919 A2 9/1990
JP 2005-280259 A 10/2005

OTHER PUBLICATIONS

Int'l Search Report for PCT/FR2018/050786, dated Jun. 7, 2018.

*Primary Examiner* — James P Mackey
(74) *Attorney, Agent, or Firm* — Dickinson Wright PLLC; Steven Hurles

(57) ABSTRACT

The curing bladder for a tire has a shape of revolution around a central axis and comprises a flexible wall made of crosslinked rubber. The surface of the wall is covered with a coating film made of a non-stick composition. When the bladder is non-inflated, the coating film has a variable thickness over the surface.

10 Claims, 3 Drawing Sheets

(51) Int. Cl.
*B29C 33/62* (2006.01)
*B29C 43/36* (2006.01)
*B05D 1/00* (2006.01)
*B05D 5/08* (2006.01)
*B29C 33/58* (2006.01)

(52) U.S. Cl.
CPC ............... *B05D 1/002* (2013.01); *B05D 1/02* (2013.01); *B05D 5/08* (2013.01); *B29C 33/58* (2013.01); *B29C 2043/3649* (2013.01); *B29D 2030/0655* (2013.01)

(56) References Cited

U.S. PATENT DOCUMENTS

| | | | |
|---|---|---|---|
| 9,381,543 B2 * | 7/2016 | Ronlan | ............... B29D 30/0645 |
| 2009/0242103 A1 | 10/2009 | Mancini | |

* cited by examiner

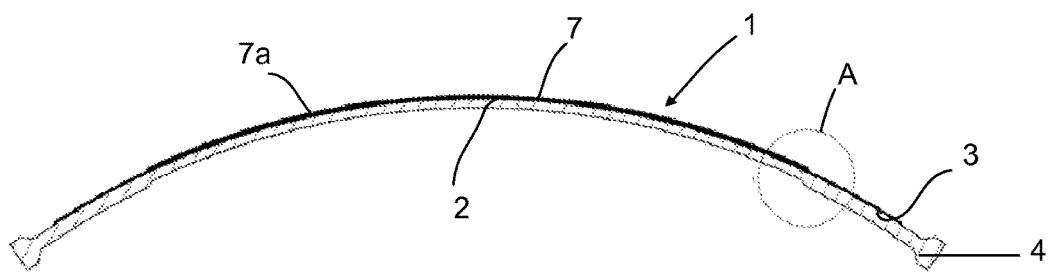
Fig 3a
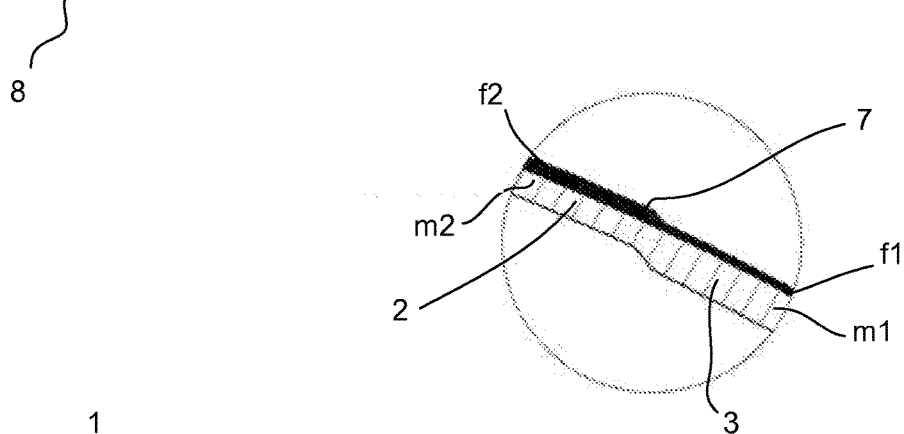
Fig 3c
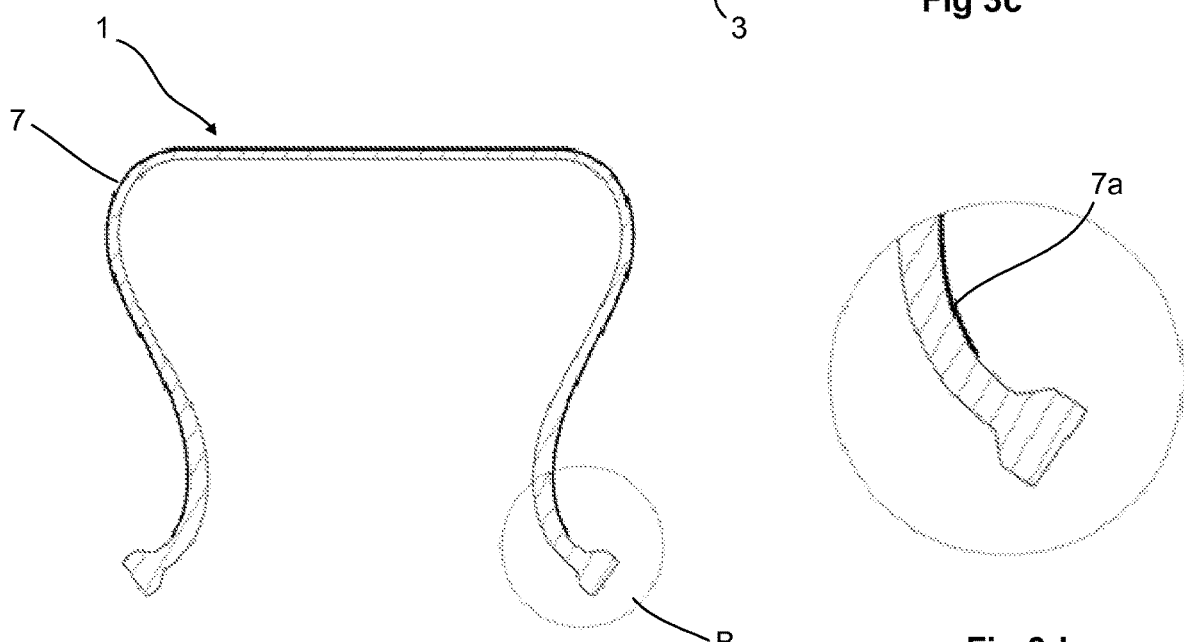
Fig 3d
Fig 3b

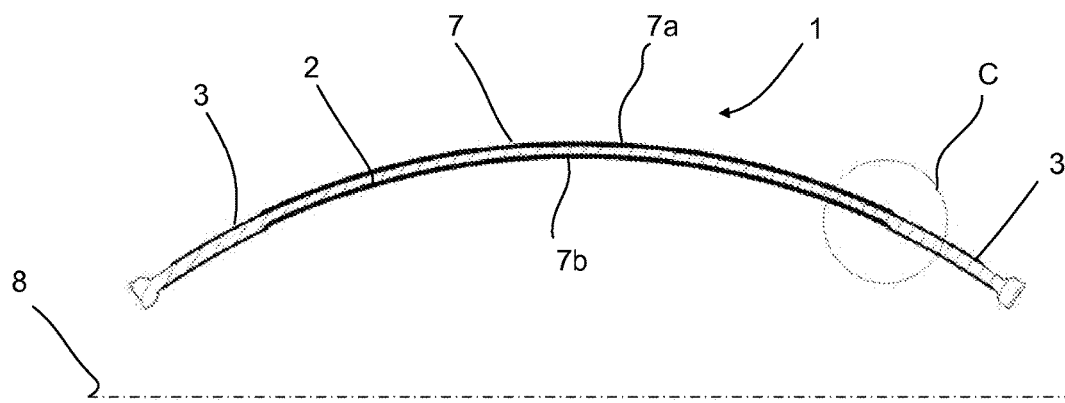
Fig 4a
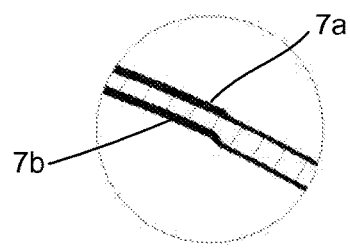
Fig 4c
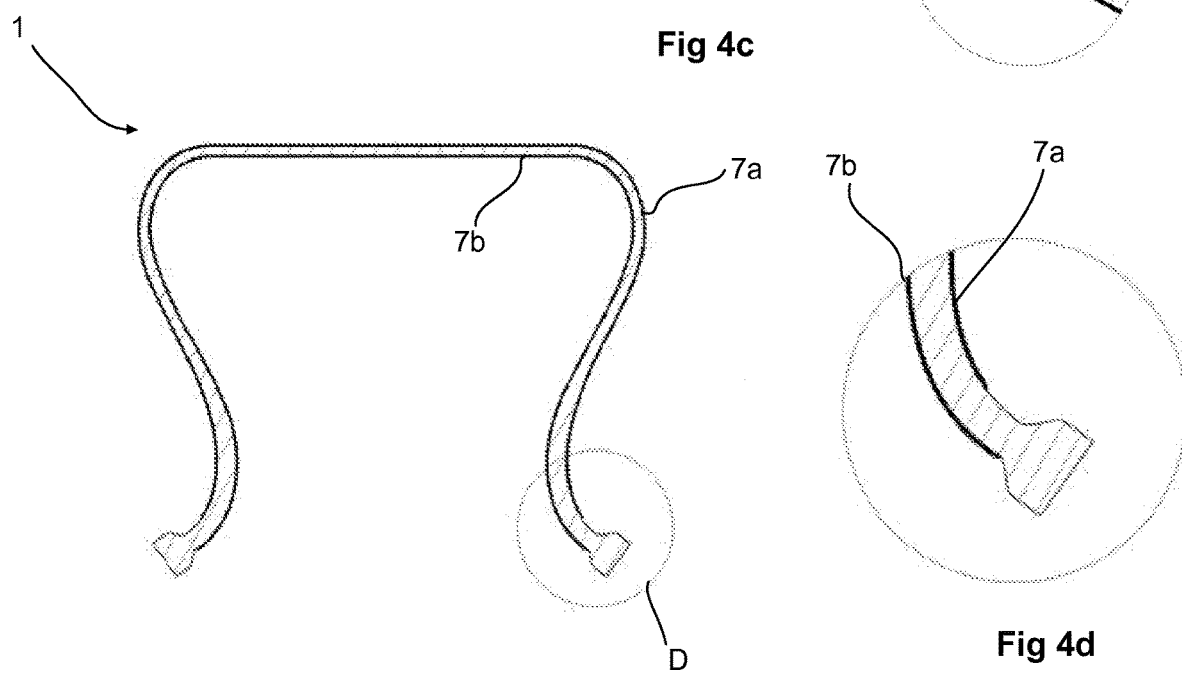
Fig 4b
Fig 4d

CURING MEMBRANE FOR A TIRE

CROSS-REFERENCE TO RELATED APPLICATION

The present application claims priority to PCT International Patent Application No. PCT/FR2018/050786, filed Mar. 29, 2018, which claims priority to FR 1752723, filed Mar. 30, 2017.

BACKGROUND OF THE INVENTION

1. Field of the Invention

The present disclosure relates to the field of tires and concerns curing bladders used in processes for the manufacture of tires.

2. Related Art

Tires are generally obtained by moulding and vulcanization of a raw casing inside a curing mould. The external walls of the casing are flattened against the internal walls of the curing mould by means of a curing bladder which can expand under the effect of a pressurized fluid. The pattern of the tread of the fittings of the mould and that of the dies is stamped onto the raw casing, which is vulcanized using heat. The curing bladder is opened out inside the raw casing, before the curing, and it is drawn in again, at the end. For this reason, relative movements occur between the bladder and the raw and cured casing, which is liable to produce deformations of the casing and wear of the bladder. In order to prevent this, it is necessary to prevent the adhesion of the casing to the curing bladder, which is usually done by treating the raw casing by coating with a solution having non-stick properties, for example based on silicone polymers, known under the name of "whitewash". Such a treatment has to be done before the curing, by an operator who works on a dedicated station, at the end of the assembling process. This operation proves to consume a great deal of time and manpower.

In order to overcome this problem, the document FR 2495181 provides for the application of a treatment to the curing bladder. Thus, the bladder is coated with a lubricating composition comprising a mixture of bentonite, of a polydimethylsiloxane, of a polyethylene glycol and of surfactants. This composition is an aqueous emulsion or dispersion which is sprayed over the external surface of the bladder and which is subsequently dried. However, it has been found that, beyond from 6 to 9 vulcanization cycles, the bladder has a tendency to stick to the casing. For this reason, it is necessary to coat it again, the consequence of which is breaks in the manufacturing process and thus a reduced productivity.

The document U.S. Pat. No. 4,863,650 provides a solution for overcoming this problem, which solution consists in treating the surface of the bladder in order to render it rough and in applying to it a film based on silicone compounds which polymerize under the influence of moisture or of heat to form crosslinked polymers which adhere to the surface of the bladder. Such a bladder makes it possible to carry out approximately 300 curing cycles. This solution admittedly proves to be more advantageous than the preceding one but the film which is applied to it does not, however, withstand the numerous strains and attacks to which it is subjected during the various phases of the curing cycles. In particular, it is known that it undergoes numerous expansion/retraction cycles and that frictional actions occur at the interface with the raw and cured casing, which has a tendency to abrade the film.

SUMMARY OF THE INVENTION

An objective of the disclosure is to overcome the disadvantages of the abovementioned documents and to provide a solution for improving the lifetime of a curing bladder treated in order to make possible the easy moulding and removal from the mould of a tire.

This objective is achieved by the disclosure, which provides a curing bladder for a tire having a shape of revolution around a central axis and comprising a flexible wall made of crosslinked rubber, the surface of the wall being covered with a coating film made of a non-stick composition, characterized in that, when the bladder is non-inflated, the coating film has a variable thickness over the said surface.

A curing bladder passes, in operation, from a drawn-in state to an opened-out state when it is inflated by the pressurized heat-exchange fluid which is injected inside the bladder during the curing. Apart from the curing, when it is inflated in order to take a toric shape, the bladder is in the drawn-in state. Non-inflated bladder is understood to mean a bladder which is not opened out but drawn in, indeed even stretched. According to the disclosure, the surface of the curing bladder is covered with a film formed of one or more non-stick coating layers of variable non-zero thickness, so as to favour the zones of the bladder which are the most stressed. In other words, these zones are covered with a non-stick layer with a greater thickness than the others. Thus, in the non-inflated state, the bladder exhibits a coating of variable non-zero thickness over its external surface facing the internal surface of the tire blank and, when it is in the opened-out state, the coating film exhibits an unvarying thickness. This makes it possible to have one and the same durability of the coating over the entire surface of the bladder and to thus prevent the risk of deterioration and, consequently, that of appearance of points of failure which can result in a loss of effectiveness of the coating.

Usefully, the said coating film is elastic. This makes it possible for the film to extend and to follow the deformations of the bladder during the opening out of the latter.

Preferably, the said wall has a variable thickness and the thickness of the coating film varies in an inversely proportional manner with the thickness of the wall.

This makes it possible to obtain an unvarying coating thickness, whatever the zone of the bladder, in the opened-out position of the latter. This is because, during the opening out thereof, the bladder extends in order to manage to virtually double its volume. The coating film of the disclosure makes it possible, by its elasticity, to extend in order to follow the deformation of the bladder. Moreover, the coating film is thicker at the places where the wall of the bladder is thinner, as it is this wall which will be subjected to the greatest deformation. In point of fact, the thickness of the coating film has to be unvarying during the opening out of the bladder inside the blank in order for the bladder to be able to withstand the attacks and frictional actions at any point of its surface, while optimizing the deposition of the non-stick layers. This is because this makes it possible to optimize each $mm^2$ of surface area of the coating film in order to use still less thereof.

Advantageously, the ratio of the thicknesses of the wall of the bladder in two contiguous zones in the non-inflated state is equal to the ratio of the thicknesses of the coating film.

This makes it possible to obtain a coating film of uniform thickness over the entire surface area of the bladder when it is opened out.

Preferably, the external surface area of the said wall is covered with an external coating film. This is because the surface which comes into contact with the raw and cured casing and which is subject to high frictional stresses during the opening out and the retraction of the bladder is covered.

Advantageously, the internal surface of the said wall is covered with an internal coating film. It turned out, during tests carried out in the laboratory, that to also cover the internal wall by deposition of one or more layers for coating the bladder made it possible to extend its lifetime.

Preferably, the composition of the internal coating film is different from that of the external coating film. The external surface of the bladder has to withstand the mechanical actions of friction in contact with the casing, whereas the internal surface is subject to hydrolysis and the action of the temperature of the steam. For this reason, the compositions of the coating films are accordingly chosen.

The aim of the disclosure is also achieved with a process for the manufacture of a curing bladder for a tire having a shape of revolution around a central axis and comprising a flexible wall made of crosslinked rubber, in which the surface of the flexible wall is covered with a film made of a non-stick composition, characterized in that a deposition of variable thickness of the said composition on the said wall is carried out when the bladder is non-inflated.

Preferably, the said deposition of non-stick composition is carried out by spraying using a paint gun and while axially and radially displacing the said gun with respect to the bladder during the rotation of the latter.

Advantageously, the thickness of the said film varies with the ratio of the rate of axial displacement of the paint gun to the rate of rotation of the bladder.

Another object of the disclosure is the use of a curing bladder according to the disclosure in a tire manufacturing process.

BRIEF DESCRIPTION OF THE DRAWINGS

A better understanding of the invention disclosure be obtained by virtue of the continuation of the description, which is based on the following figures:

FIG. 3a is a sectional view of a curing bladder covered with a coating film on the outside in the non-opened-out position, FIG. 3b is a sectional view of the bladder of FIG. 3a in the opened-out position and FIGS. 3c and 3d are views of the details A and B on a magnified scale of the bladder illustrated in FIGS. 3a and 3b;

FIG. 4a is a sectional view of a curing bladder covered with coating film on the outside and on the inside in the non-opened-out position, FIG. 4b is a sectional view of the bladder of FIG. 4a in the opened-out position and FIGS. 4c and 4d are views of the details C and D on a magnified scale of the bladder illustrated in FIGS. 4a and 4b.

DETAILED DESCRIPTION OF THE ENABLING EMBODIMENTS

In the different figures, identical or similar elements carry the same reference. Their description is thus not systematically repeated.

Figure 2A:
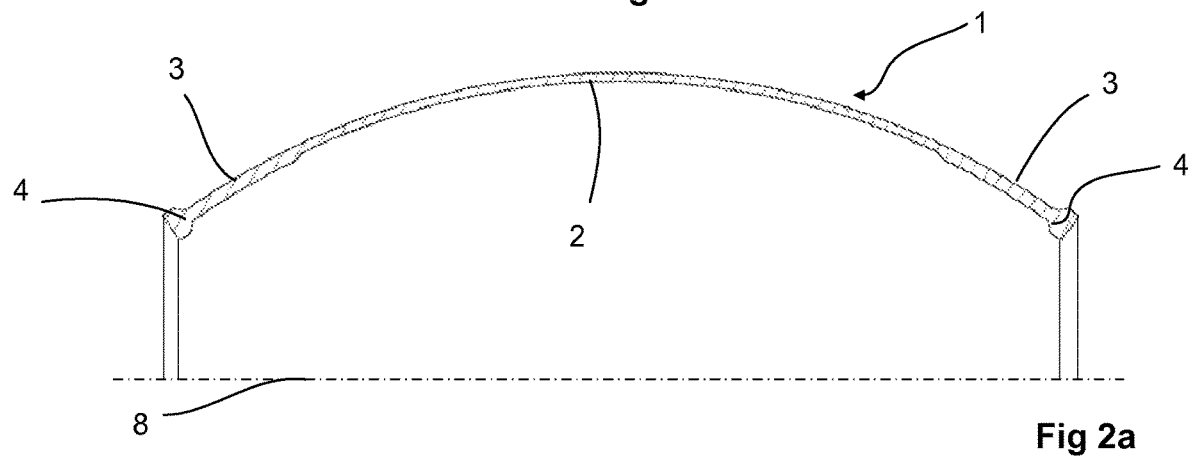
FIG. 2a is a sectional view of a curing bladder not covered with coating in the non-opened-out position and FIG. 2b is a sectional view of the bladder of FIG. 2a in the opened-out position.
Figure 2B:
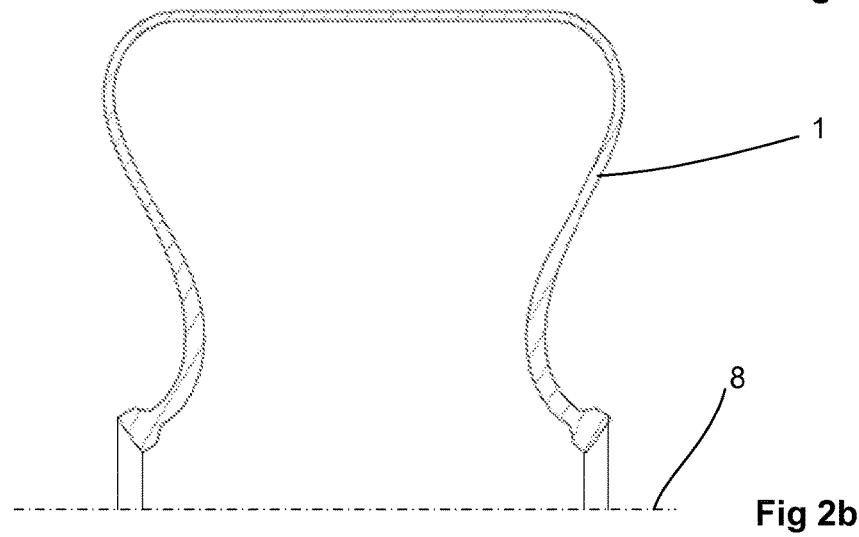

FIGS. 2a and 2b illustrate, by axial sectional views, half of a curing bladder 1, which has a shape of revolution around a central axis 8, before being covered with non-stick coating layer. The curing bladder 1 comprises a flexible wall and is made of a rubber of butyl type. The curing bladder 1 is illustrated in the non-opened-out state in FIG. 2a; it has a tubular general shape of oval axial section. The bladder exhibits a central part 2 of unvarying thickness delimited axially by two end zones 3 each terminating in a heel 4.

In that which follows, an axial direction denotes a direction parallel to the central axis 8 of the bladder, a radial direction denotes a direction perpendicular to the central axis, a radial plane denotes a plane containing the central axis and a radial direction, and a circumferential direction denotes a direction perpendicular to the radial plane.

In operation, the curing bladder 1 is fixed by the heels 4 to the flanges of the upper and lower platens of a curing press (which are not represented) and, when the pressurized heat-exchange fluid is injected into it, it inflates and takes a toroidal general shape (FIG. 2b) inside the casing to be vulcanized, itself placed in a mould positioned in the curing press.

When it is opened out under the effect of the pressure of the heat-exchange fluid, its flexible wall stretches until the raw casing is flattened against the rigid walls of the curing mould. For this reason, the thickness of the wall of the bladder decreases in the central zone 2 and in the end zones 3 proportionally to the pressure applied. Thus, during a deposition of non-stick coating layer or film of unvarying thickness on the non-opened-out bladder, during the expansion of the latter, the coating film may break or crack. Such cracks or discontinuities in the coating film can create points of attachment of the raw or cured casing to the bladder, the consequence of which is the appearance of defects in the tire and damage to the curing bladder.

In order to overcome this problem, the disclosure provides a curing bladder comprising, in the stretched but non-inflated state, a coating film made of a non-stick composition of variable thickness preferably applied to the working surface of the bladder. Working surface is understood to mean the surface of the bladder intended for contact with the tire and which occurs outside its fixing part consisting of the zone of the heels 4. Stretched state of the bladder is understood to mean the state in which it is tightened in order to retain the ovoid shape illustrated in FIG. 2a, without forming folds.

In one embodiment of the disclosure, the coating film made of a non-stick composition is applied directly to the surface of the curing bladder.

Figure 1:
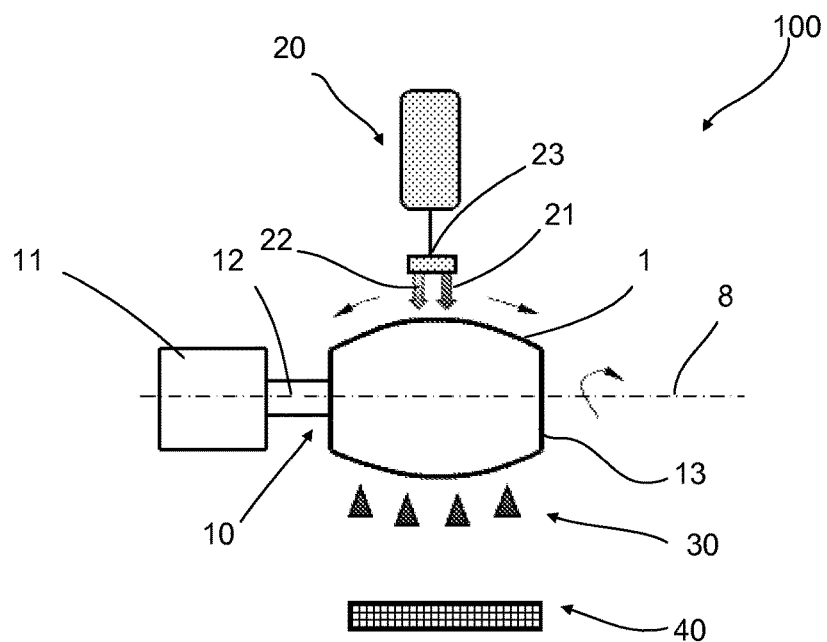
FIG. 1 is a diagrammatic view of an installation which carries out the deposition of a coating on a curing bladder of the disclosure.

FIG. 1 illustrates an installation 100 which makes it possible to carry out a deposition of one or more coating layers on a curing bladder 1. The bladder is supported by a device 10 comprising an electric motor 11 for driving a barrel 13 in rotation around the central axis 8 via a rotating shaft 12, onto which barrel the bladder 1 is slipped and attached. The barrel 13 is made so as to be able to tighten the bladder 1 (for example by exerting a tensile load on it or by a gentle inflation) in order to ensure that there are no folds in order to be able to obtain a uniform deposition of the coating layer. The installation also comprises a robot arm 20 which comprises, at its end, a paint gun 21 (for example an electric gun) and a plasma torch 22 which are arranged side by side on a common platen 23. The robot arm 20 is induced to move in the axial and radial direction with respect to the axis 8 so as to sweep the external surface of the curing bladder 1.

The plasma torch 22 is used to carry out a treatment of the surface of the bladder prior to the coating deposition, in order to improve the wettability and thus the adhesion of the coating. This is because the first function of the plasma torch is to increase the surface energy of the bladder by destroying the organic compounds and compounds for activation of the surface. The second function of the plasma is to create reactive groups which make it possible for the molecules of the coating to adhere to the surface of the bladder. The plasma used in the device of the disclosure is a low-pressure oxygen plasma or air plasma. Such a plasma makes it possible to replace the hydrogen atoms with oxygen atoms which provide free valence electrons for the bonding with the molecules of the coating.

The choice of the use of a plasma torch before the deposition of the coating is made as a function of the nature of the latter. Thus, some coatings, for example coatings, the composition of which is based on silicone, exhibit a sufficient ability to adhere to the bladder and, in this case, the use of a plasma torch is no longer necessary. Other coatings, such as coatings based on crosslinkable epoxide elastomers, require an initial treatment by plasma.

In operation, the bladder 1 is installed on the barrel 13, is slightly tightened and is fixed to the barrel. The barrel 13 with the bladder 1 is driven in rotation around the central axis 8 and the robot arm 20 is moved in the axial and radial direction with respect to the axis 8, so that it follows the profile of the bladder 1. The gun 21 deposits one or more non-stick coating layers on the bladder 1, which is of predetermined thickness, as will be explained in that which follows. When the coating has been deposited on the bladder 1, the feeding of the gun 21 is halted and the robot arm 20 is immobilized. A heating element 30, for example of the type having an infrared lamp, is activated and the rotation of the barrel 13 around the axis 8 is maintained. A suction device 40 is provided in order to remove the fumes resulting from the polymerization of the non-stick coating. When the coating is polymerized, the installation 100 is halted and the bladder 1 is removed from the barrel 13. If it is desired, furthermore, to produce a non-stick coating inside the bladder, the bladder is turned over so as to expose its interior surface to the action of the robot arm 20 and the same operation as that described above relating to the deposition of a coating film on the outside of the bladder is carried out.

FIG. 3a illustrates a curing bladder 1, the external surface of which is covered with a film 7 which is an external coating film 7a. As more obvious in the detailed view of FIG. 3c, the central part 2 of the bladder 1 has a thickness m2 and the coating film has a thickness f2, whereas the end part 3 of the bladder has a thickness m1 and the coating film has a thickness f1. The thicknesses are chosen so that m1*f1=m2*f2. By way of example, the thickness of the bladder m1 in the central zone is 5 mm, the thickness of the film f1 in the same zone is 42 µm and the thickness of the bladder m2 in the end zone is 7 mm and the thickness of the film f2 in the same zone is 30 µm.

FIG. 3b illustrates the bladder 1 of FIG. 3a in the opened-out position. As more obvious in FIG. 3d, the thickness of the film 7 is unvarying over the external surface or profile of the opened-out bladder.

FIG. 4a illustrates the curing bladder 1 of FIG. 3a furthermore covered with an internal coating film 7b. Similarly, the same ratio of thicknesses is adhered to between the thickness of the internal coating film and the thickness of the wall of the bladder in the central zone 2 and the end zone 3.

FIG. 4b illustrates the bladder 1 of FIG. 4a in the opened-out position. As more obvious in FIG. 4c, the thickness of the film 7 is unvarying over the external and internal surface or profile of the opened-out bladder.

The bladder represented in the appended figures is illustrated by way of example. Different types of curing bladders are known in the state of the art with different geometries, in particular with variable thicknesses of their flexible wall. During their coating with a film made of a non-stick composition according to the disclosure, the thickness of the coating film 7 varies in an inversely proportional manner with the thickness of the wall at any point of the working surface of the latter in the non-inflated state of the bladder.

In an alternative embodiment of the disclosure, the composition of the coating material is a silicone composition which can cure in the presence of water or of atmospheric moisture. Such a composition is of the type such as described in the document WO 2015/082837.

In another alternative embodiment of the disclosure, the composition of the coating material is a rubber composition comprising an epoxide elastomer crosslinked by a polycarboxylic acid. Such a composition is of the type such as described in the document WO 2015/193315 on behalf of the Applicant Company.

Preferably, the composition of the internal coating material of the bladder is a composition based on silicone which withstands hydrolysis.

In another embodiment of the disclosure, the bladder is directly coated with an adhesion primer layer. The adhesion primer layer is subsequently directly coated with a layer of non-stick coating composition according to the disclosure.

The coating film has a thickness of between 5 and 100 µm and preferably of between 15 and 30 µm. It is preferably produced by successive depositions of several superimposed layers. The film is elastic and it has an elongation capacity of between 200% and 300% and a Shore A hardness of between 0 and 40.

The thickness of the internal coating film is different from that of the external coating film, and it is preferably less than 30 µm.

The external surface of the wall of the bladder is covered with an external coating using the device as described with reference to FIG. 1. In order to carry out the deposition of the coating having a variable thickness on the lateral external surface of the wall, the robot arm 20 is displaced along a predetermined trajectory programmed into the memory of the automaton. The trajectory is correlated with a predetermined number of passes in order to obtain a deposition of variable thickness on the wall. The paint gun 21 thus deposits, by successive displacements along the wall of the bladder, during the rotation of the latter, the number of layers necessary to produce a film of variable thickness. The parameters of the latter are chosen as a function of the type of coating. By way of example, a paint gun comprising a nozzle having a diameter of the outlet orifice of 0.9 mm, at an atomization pressure of 2.5 bars, is used and the particles of the coating composition are sprayed at a distance of approximately 160 to 180 mm, with respect to the surface of the bladder. The jet has a width of 60 mm and the jet is displaced with a step of approximately 30 mm per rotational turn of the bladder until the film of desired thickness is obtained.

A curing bladder is thus covered with a film of variable thickness over its external and internal surface. The curing bladder is subsequently fixed, by its heels, to the support platens of the bladder within a curing press. The bladder can then come into contact with the tire blank without adhering to the latter and without having to coat the internal surface of the tire blank beforehand with non-stick product before the curing during the manufacture of a tire. In tests carried out in the laboratory, it turned out that the coating thus obtained withstands numerous curing cycles.

Other alternative forms and embodiments of the disclosure can be envisaged without departing from the scope of its claims.

It is possible to envisage depositing a non-stick coating of variable thickness in the central zone of the bladder, so as to reinforce the most stressed zones of the bladder, for example the zone of the shoulders, as this is the zone of the bladder exhibiting the greatest deformations (elongation of up to 40%).

The invention claimed is:

1. A curing bladder for a tire having a shape of revolution around a central axis and comprising a flexible wall made of crosslinked rubber, the surface of the wall being covered with a coating film made of a non-stick composition, wherein when the bladder is non-inflated, the coating film has a variable thickness over the said surface.

2. The bladder according to claim 1, wherein the said coating film is elastic.

3. The bladder according to claim 2, wherein the said wall has a variable thickness and in that the thickness of the coating film varies in an inversely proportional manner with the thickness of the wall.

4. The bladder according to claim 3, wherein the ratio of the thicknesses of the wall of the bladder in two contiguous zones is equal to the ratio of the thicknesses of the coating film in the same zones.

5. The bladder according to claim 1, wherein the external surface of the said wall is covered with an external coating film.

6. The bladder according to claim 5, wherein the internal surface of the said wall is covered with an internal coating film.

7. The bladder according to claim 6, wherein the composition of the internal coating film is different from that of the external coating film.

8. A process for the manufacture of a curing bladder for a tire having a shape of revolution around a central axis and comprising a flexible wall made of crosslinked rubber, in which the surface of the flexible wall is covered with a film made of a non-stick composition, wherein a deposition of variable thickness of the said composition on the said wall is carried out when the bladder is non-inflated.

9. The process according to claim 8, wherein the said deposition of non-stick composition is carried out by spraying using a paint gun and while axially and radially displacing the said gun with respect to the bladder during the rotation of the latter.

10. The process according to claim 9, wherein the thickness of the said film varies with the ratio of the rate of axial displacement of the paint gun to the rate of rotation of the bladder.

* * * * *